United States Patent
Iida et al.

(10) Patent No.: US 7,367,414 B2
(45) Date of Patent: May 6, 2008

(54) HYBRID VEHICLE AND METHOD OF CONTROLLING THE SAME

(75) Inventors: Hiroaki Iida, Hashima (JP); Hideo Itano, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 247 days.

(21) Appl. No.: 10/559,828

(22) PCT Filed: Jun. 15, 2004

(86) PCT No.: PCT/JP2004/008686

§ 371 (c)(1),
(2), (4) Date: Dec. 6, 2005

(87) PCT Pub. No.: WO2004/113112

PCT Pub. Date: Dec. 29, 2004

(65) Prior Publication Data

US 2006/0175103 A1 Aug. 10, 2006

(30) Foreign Application Priority Data

Jun. 23, 2003 (JP) .............................. 2003-178730

(51) Int. Cl.
*B60K 6/00* (2007.10)
*B60K 31/00* (2006.01)

(52) U.S. Cl. .................. 180/65.2; 180/65.3; 180/65.4; 180/65.6; 180/170; 180/171; 903/940; 903/941; 903/942; 701/93

(58) Field of Classification Search ............... 180/65.2, 180/65.3, 65.4, 65.6, 170, 171; 903/940–942; 701/93
See application file for complete search history.

(56) References Cited

U.S. PATENT DOCUMENTS 6,389,348 B1 * 5/2002 Takagi et al. .................. 701/58
6,915,782 B2 * 7/2005 Hanada et al. ............... 123/399

FOREIGN PATENT DOCUMENTS

| EP | 0 962 352 A2 | 12/1999 |
|---|---|---|
| EP | 0 983 894 A2 | 3/2000 |
| JP | 09-207622 A | 8/1997 |
| JP | 2001-157305 A | 6/2001 |
| JP | 2001-191814 A | 7/2001 |
| JP | 2003-018706 A | 1/2003 |

* cited by examiner

*Primary Examiner*—Christopher P. Ellis
*Assistant Examiner*—John R. Olszewski
(74) *Attorney, Agent, or Firm*—Kenyon & Kenyon LLP

(57) ABSTRACT

In a constant speed drive (in an auto cruise), the procedure of the invention executes proportional control to set an accelerator opening Acc corresponding to an observed vehicle speed and a target vehicle speed. When the accelerator opening Acc is less than a preset opening A2 included in a dead zone where a torque demand Tr* is kept equal to 0, the procedure corrects the accelerator opening Acc to have a corresponding torque demand Tr* included in a negative zone where the torque demand Tr* takes negative values and linearly increases. This arrangement heightens the linearity of the graph of the torque demand Tr* against the accelerator opening Acc in the constant speed drive, compared with the linearity in a standard drive.

9 Claims, 8 Drawing Sheets

HYBRID VEHICLE AND METHOD OF CONTROLLING THE SAME

This is a 371 national phase application of PCT/JP2004/008686 filed 15 Jun. 2004, claiming priority to Japanese Patent Application No. 2003-178730 filed 23 Jun. 2003, the contents of which are incorporated herein by reference.

FIELD OF THE INVENTION

The present invention relates to a hybrid vehicle and a hybrid vehicle control method. More specifically, the invention relates to a hybrid vehicle driven with power from a motor and an internal combustion engine, where the motor is capable of outputting power to a drive shaft linked with an axle, and a method for controlling the hybrid vehicle.

BACKGROUND OF THE INVENTION

One proposed type of hybrid vehicle has a clutch motor, which includes an inner rotor connecting with a crankshaft of an engine and an outer rotor connecting with a drive shaft linked with an axle, and an assist motor that outputs power to the drive shaft (see, for example, JAPANESE PATENT LAID-OPEN GAZETTE No. 9-207622). When a target vehicle speed is set for a constant speed drive (auto cruise), the hybrid vehicle calculates energy to cancel a difference between the target vehicle speed and an observed vehicle speed, increases energy output from the engine by the calculated energy, and increases the torque of the assist motor by a torque corresponding to the increased output energy. The hybrid vehicle is thus driven stably at the target vehicle speed. An insufficiency of energy due to a delay of a response to the increase in energy output from the engine, that is, energy required to increase the torque of the assist motor, is supplied from a battery.

The automobile, as well as the hybrid vehicle, often uses a map to set a vehicle driving force corresponding to an accelerator opening, which reflects a driver's accelerator step-on action. Even in the constant speed drive of the automobile at the target vehicle speed set by the driver, the accelerator opening may be set according to the observed vehicle speed and the target vehicle speed. The control in the standard drive is then applicable to the control after setting the accelerator opening in the constant speed drive. The hybrid vehicle controls the internal combustion engine and the motor based on the accelerator opening. It is accordingly desirable that the control in the constant speed drive shares a greater portion of the control in the standard drive. The map used to set the vehicle driving force corresponding to the accelerator opening typically includes a dead zone where the vehicle driving force is kept unchanged to 0 with a variation in accelerator opening. This prevents the vehicle driving force from frequently fluctuating between the positive values and the negative values. In the constant speed drive on a downslope with the map including the dead zone, the accelerator opening varied according to the observed vehicle speed and the target vehicle speed may enter the dead zone of the map. In this case, the vehicle speed is not stabilized to the target vehicle speed.

SUMMARY OF THE INVENTION

The hybrid vehicle and the corresponding hybrid vehicle control method of the invention aim to stabilize the vehicle speed to a target vehicle speed even in a drive on a downslope, while ensuring a large common portion of control in a constant speed drive and control in a standard drive.

In order to achieve at least part of the aforementioned aim, the hybrid vehicle and the corresponding hybrid vehicle control method are constructed as follows.

A hybrid vehicle of the present invention is a hybrid vehicle driven with power from a motor and an internal combustion engine, where the motor is capable of outputting power to a drive shaft linked with an axle, the hybrid vehicle including: a vehicle speed sensor that measures a vehicle speed; a target vehicle speed setting module that sets a target vehicle speed for a constant speed drive, in response to a driver's setting action; and a drive control module that, in the case of no setting the target vehicle speed by the target vehicle speed setting module, sets a vehicle drive command value in response to the driver's accelerator step-on action, refers to a non-linear setting map to set a vehicle driving force corresponding to the vehicle drive command value, and drives and controls the motor and the internal combustion engine to drive the hybrid vehicle with the setting of the vehicle driving force, while in the case of setting the target vehicle speed by the target vehicle speed setting module, the drive control module setting the vehicle drive command value, based on the vehicle speed measured by the vehicle speed sensor and the target vehicle speed, so as to drive the hybrid vehicle at the target vehicle speed, setting the vehicle driving force corresponding to the vehicle drive command value, in order to have a higher linearity than that of the vehicle driving force set by a non-linear portion of the non-linear setting map with respect to at least part of the vehicle drive command value equivalent to the non-linear portion, and driving and controlling the motor and the internal combustion engine to drive the hybrid vehicle with the setting of the vehicle driving force.

When the vehicle drive command value is set in response to the driver's accelerator step-on action, the hybrid vehicle of the invention refers to the non-linear setting map to set the vehicle driving force corresponding to the setting of the vehicle drive command value. When the vehicle drive command value is set based on the target vehicle speed set for a constant speed drive and the observed vehicle speed to drive the hybrid vehicle at the target vehicle speed, the hybrid vehicle of the invention sets the vehicle driving force to have a higher linearity than that of the vehicle driving force set in a non-linear portion of the non-linear setting map with respect to at least part of the vehicle drive command value corresponding to the non-linear portion. The motor, which is capable of outputting power to the drive shaft, and the internal combustion engine are driven and controlled to drive the hybrid vehicle with the setting of the vehicle driving force. In the constant speed drive, the vehicle driving force is set to have the higher linearity to the vehicle drive command value. The control in the constant speed drive sets the vehicle driving force to have the higher linearity to part of the vehicle drive command value in the non-linear portion of the non-linear setting map, while otherwise sharing the control in the standard drive. The enhanced linearity in the constant speed drive desirably stabilizes the vehicle speed to the target vehicle speed, even when the hybrid vehicle runs on a down slope.

In one preferable embodiment of the hybrid vehicle of the invention, the non-linear setting map has a negative zone, a dead zone kept substantially equal to 0, and a positive zone against the vehicle drive command value, and the drive control module sets the vehicle driving force according to the non-linear setting map and the vehicle drive command value, which is not less than a preset opening included in the dead zone of the non-linear setting map, in response to setting of the target vehicle speed, while correcting the vehicle drive command value, which is less than the preset opening, to make an area to the preset opening equivalent to the negative zone and setting the vehicle driving force according to the non-linear setting map and the corrected vehicle drive command value. In this embodiment, the vehicle drive command value, which is less than the preset opening, is corrected to make an area to the preset opening equivalent to the negative zone of the non-linear setting map. Such correction ensures application of the control in the standard drive to the control in the constant speed drive. Here, the non-linear setting map may linearly increase the vehicle driving force with an increase in vehicle drive command value in the negative zone and in the positive zone.

In another preferable embodiment of the hybrid vehicle of the invention, the drive control module uses a linear setting map, which has a higher linearity than the non-linear setting map, to set the vehicle driving force corresponding to the vehicle drive command value, in response to setting of the target vehicle speed. This ensures application of the control in the standard drive to the control in the constant speed drive, through a simple change of the map of the vehicle drive command value to be referred to. In this embodiment, the non-linear setting map may have a negative zone, a dead zone kept substantially equal to 0, and a positive zone against the vehicle drive command value, and the linear setting map may have a negative zone which has a higher fraction, a dead zone which is kept substantially equal to 0 and has a lower fraction, compared with the fractions of the negative zone and the dead zone in the non-linear setting map, and a positive zone. Here, the non-linear setting map and the linear setting map may linearly increase the vehicle driving force with an increase in vehicle drive command value in the negative zone and in the positive zone.

As one preferable structure, the hybrid vehicle of the invention may further include an electric power-mechanical power input-output module that is linked with an output shaft of the internal combustion engine and the drive shaft and outputs at least part of the power from the internal combustion engine to the drive shaft through inputs and outputs of electric power and mechanical power. In this structure, the electric power-mechanical power input-output module may include:

a three shaft-type power input-output assembly that is linked with three shafts, that is, the output shaft of the internal combustion engine, the drive shaft, and a third shaft and inputs and outputs power to a residual shaft, based on powers input from and output to two shafts among the three shafts; and a generator that inputs and outputs power from and to the third shaft. Further in this structure, the electric power-mechanical power input-output module may include a pair-rotor motor that has a first rotor linked with the output shaft of the internal combustion engine and a second rotor linked with the drive shaft and outputs at least part of the power from the internal combustion engine to the drive shaft through input and output of electric power by electromagnetic interaction between the first rotor and the second rotor.

The technique of the present invention is not restricted to the hybrid vehicle described above, but is also applicable to a hybrid vehicle control method.

DETAILED DESCRIPTION

Figure 1:
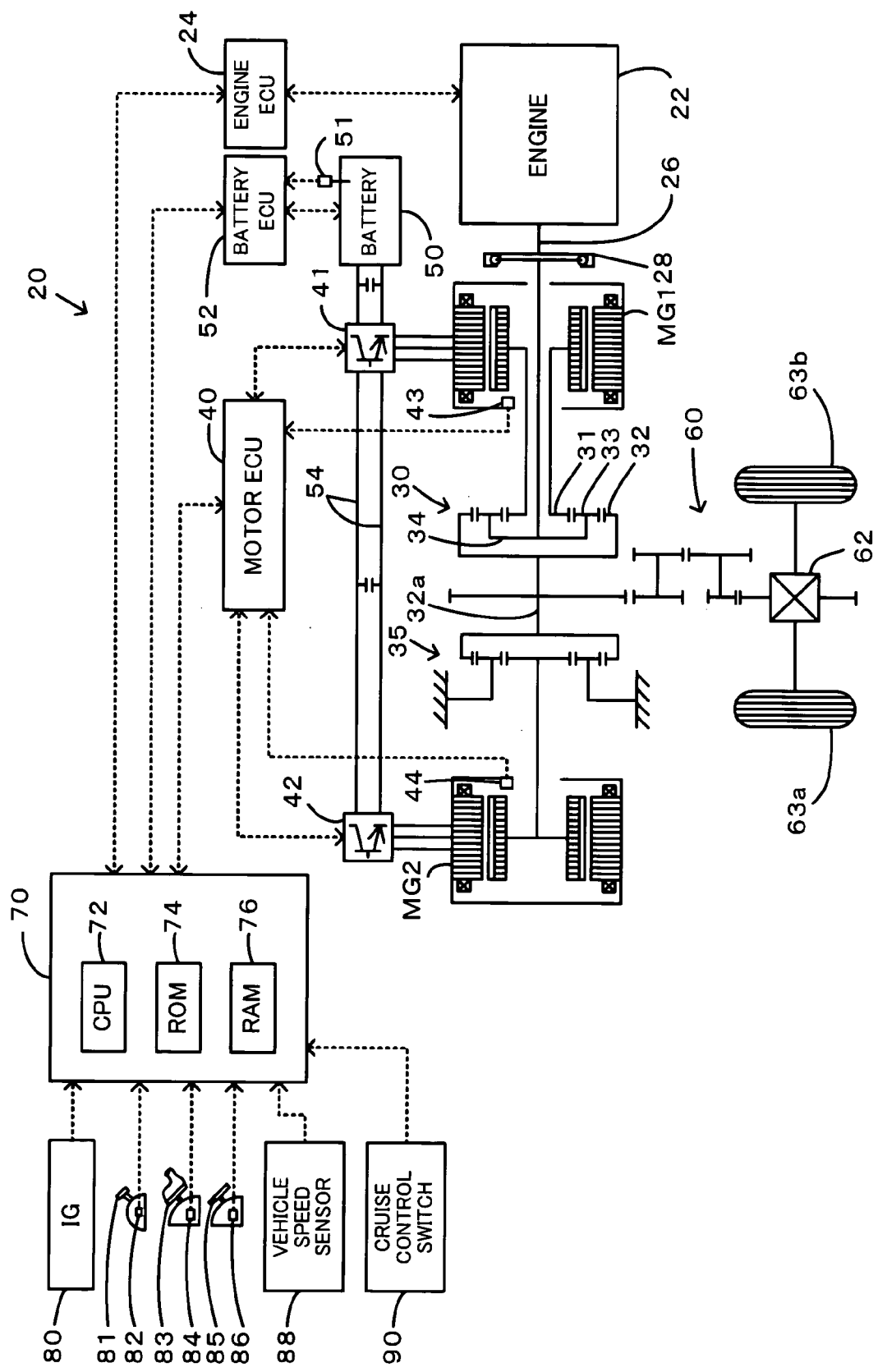
FIG. 1 schematically illustrates the construction of a hybrid vehicle 20 with a power output apparatus mounted thereon in one embodiment of the invention.

One mode of carrying out the invention is discussed below as a preferred embodiment. FIG. 1 schematically illustrates the construction of a hybrid vehicle 20 with a power output apparatus mounted thereon in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution integration mechanism 30 has a sun gear or external gear 31, a ring gear or internal gear 32 that is arranged concentrically with the sun gear 31, multiple pinion gears 33 that engage with both the sun gear 31 and the ring gear 32, and a carrier 34 that holds the multiple pinion gears 33 to allow their revolutions and rotations on their axes. The power distribution integration mechanism 30 is constructed as a planetary gear mechanism that has differential motions with the sun gear 31, the ring gear 32, and the carrier 34 as rotating elements. In the power distribution integration mechanism 30, the carrier 34 is linked with the crankshaft 26 of the engine 22, the sun gear 31 is linked with the motor MG1, and the ring gear 32 is linked with the reduction gear 35 via the ring gear shaft 32a. When the motor MG1 functions as an electric generator, the power output from the engine 22 and transmitted through the carrier 34 is distributed to the sun gear 31 and the ring gear 32 at their gear ratio. When the motor MG1 functions as an electric motor, on the other hand, the power output from the engine 22 and transmitted through the carrier 34 is integrated with the power output from the motor MG1 and transmitted through the sun gear 31 and is output to the ring gear 32. The power output to the ring gear 32 is eventually transmitted to drive wheels 63a and 63b of the vehicle via the ring gear shaft 32a, a gear mechanism 60, and a differential gear 62.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature measured by a temperature sensor (not shown) attached to the battery 50. The battery ECU 52 outputs data relating to the state of the battery 50 to the hybrid electronic control unit 70 according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, a non-illustrated input-output port, and a non-illustrated communication port. The hybrid electronic control unit 70 receives various signals via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, a vehicle speed V from a vehicle speed sensor 88, and a setting signal and a cancellation signal for constant-speed drive from a cruise control switch 90 that is located in the vicinity of a steering wheel. In response to input of the setting signal from the cruise control switch 90, the hybrid electronic control unit 70 sets the current vehicle speed to a target vehicle speed V* and activates a constant speed drive mode (auto cruise mode). In response to detection of a step-on of the brake pedal 85 according to the brake pedal position BP from the brake pedal position sensor 86 or in response to input of the cancellation signal from the cruise control switch 90, the hybrid electronic control unit 70 cancels the setting of the target vehicle speed V* and deactivates the auto cruise mode. The hybrid electronic control unit 70 is connected with the engine ECU 24, the motor ECU 40, and the battery ECU 52 via the communication port and transmits diverse control signals and data to and from the engine ECU 24, the motor ECU 40, and the battery ECU 52, as mentioned above.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of the accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 2:
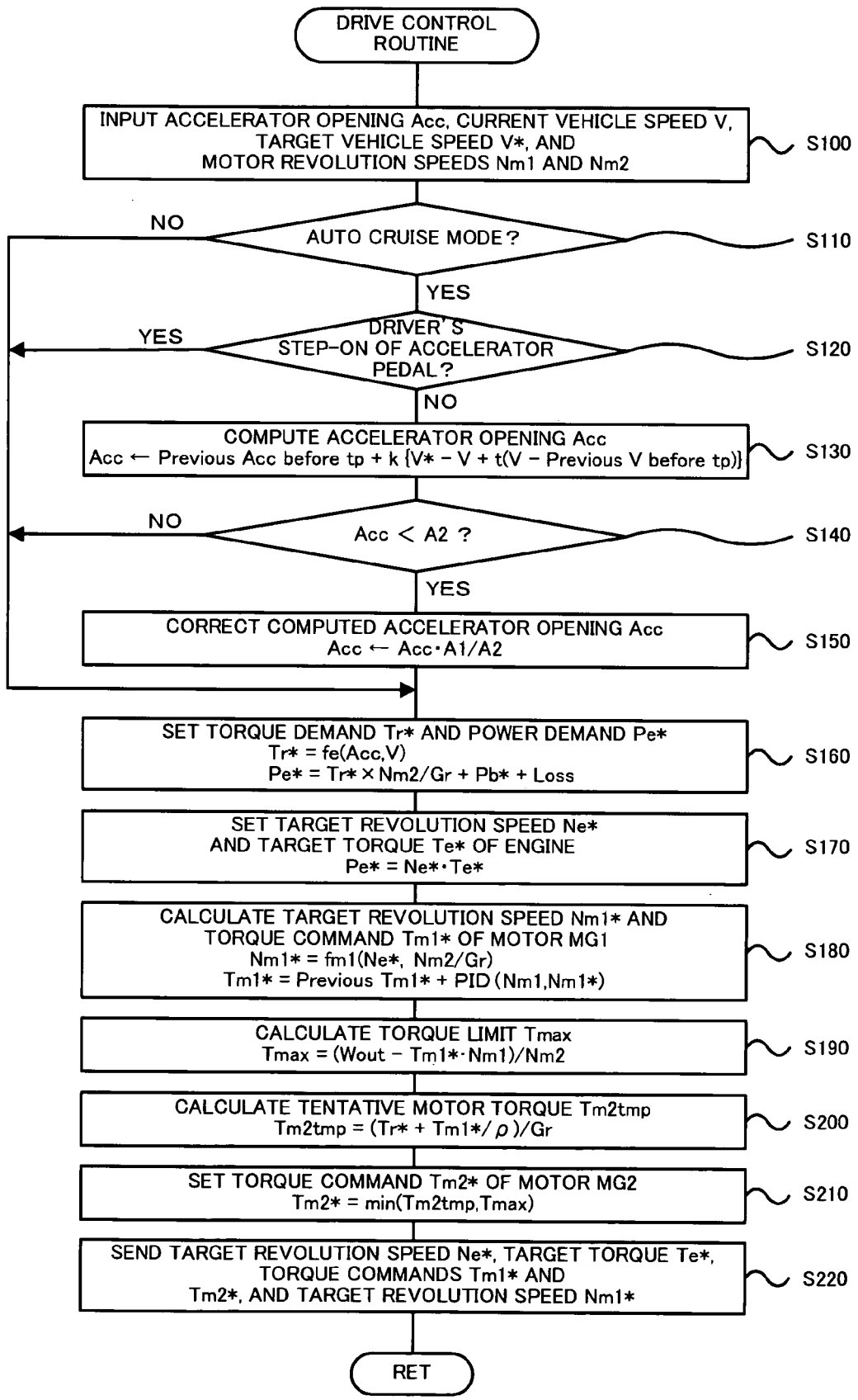
FIG. 2 is a flowchart showing a drive control routine executed by a hybrid electronic control unit 70.

The following describes the operations of the hybrid vehicle 20 of the embodiment thus constructed, especially the operation in the constant speed drive. FIG. 2 is a flowchart showing a drive control routine executed by the hybrid electronic control unit 70. This routine is carried out repeatedly at preset time intervals (for example, at every 8 msec). For explanation of the operation in the constant speed drive (in the auto cruise), it is assumed that the hybrid vehicle 20 is driven in a torque conversion drive mode or in a charge-discharge drive mode.

When the drive control routine starts, the CPU 72 of the hybrid electronic control unit 70 first inputs various data required for control, that is, the accelerator opening Acc from the accelerator pedal position sensor 84, the current vehicle speed V from the vehicle speed sensor 88, the setting of the target vehicle speed V*, and revolution speeds Nm1 and Nm2 of the motors MG1 and MG2 (step S100). The procedure of this embodiment reads out and inputs the target vehicle speed V*, which has been set and stored at a specified address in the RAM 76 in response to input of the setting signal from the cruise control switch 90. The procedure of this embodiment receives the revolution speed Nm1 and Nm2 of the motors MG1 and MG2, which have been calculated according to rotational positions of rotors in the motors MG1 and MG2 detected by rotational position detection sensors 43 and 44, from the motor ECU 40 via communication.

After input of the various required data, the CPU 72 determines whether the auto cruise mode is activated, based on the setting of the target vehicle speed V* or a setting flag of the auto cruise mode (step S110). When the auto cruise mode is active, the CPU 72 subsequently determines whether the driver is stepping on the accelerator pedal 83 (step S120). When the auto cruise mode is inactive or when the driver is stepping on the accelerator pedal 83 in the auto cruise mode, the program executes a subsequent series of processing (processing of and after step S160 as discussed later), based on the accelerator opening Acc set by the driver's step-on of the accelerator pedal 83. When the auto cruise mode is active and when the driver is not stepping on the accelerator pedal 83, on the other hand, the program executes a series of processing to set the accelerator opening Acc (steps S120 through S150) and then the subsequent series of processing (steps S160 through S220) based on the setting of the accelerator opening Acc. The description first regards the series of processing to set the accelerator opening Acc in the auto cruise mode and then the subsequent series of processing based on the setting of the accelerator opening Acc.

When the auto cruise mode is active and when the driver is not stepping on the accelerator pedal 83, the CPU 72 computes an accelerator opening Acc from the input target vehicle speed V*, the input current vehicle speed V, a previous vehicle speed V read in a previous cycle of this routine before a time period tp (previous V before tp), and a previous accelerator opening Acc used in the previous cycle of this routine before the time period tp (previous Acc before tp) according to Equation (1) given below (step S130). In Equation (1), 't' represents a coefficient for computing a variation in vehicle speed after a preset time period (for example, after 2 seconds or 3 seconds) based on the difference between the current vehicle speed V and the previous vehicle speed V before the time period tp, and 'k' represents a gain of a proportional term. Equation (1) is thus regarded as proportional control with an estimated vehicle speed after the preset time period.

$$Acc \leftarrow \text{Previous Acc before tp} + k\{V^* \square V + t (V \square \text{Previous V before tp})\} \quad (1)$$

Figure 3:
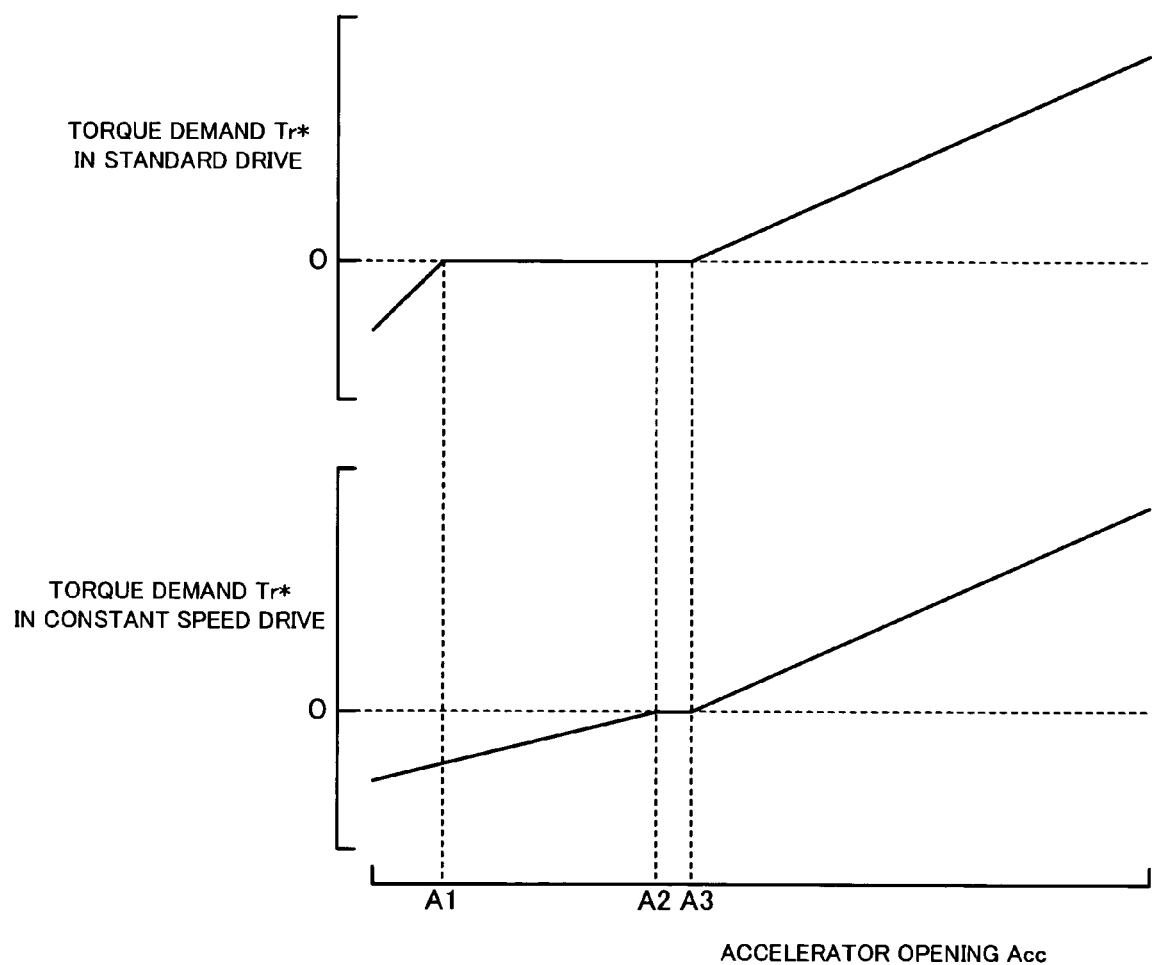
FIG. 3 shows variations in torque demand Tr* against accelerator opening Acc in a standard drive and in a constant speed drive at a preset vehicle speed.

After computation of the accelerator opening Acc, the computed accelerator opening Acc is compared with a preset opening A2 (step S140). FIG. 3 shows variations in torque demand Tr*, which is the torque required to the hybrid vehicle 20 (the ring gear shaft 32a), against the accelerator opening Acc in a standard drive and in a constant speed drive at a preset vehicle speed (for example, at 50 km/h). The graph of the torque demand Tr* against the accelerator opening Acc in the standard drive includes a negative zone where the accelerator opening Acc is less than an opening A1 and the torque demand Tr* takes negative values and linearly increases, a dead zone where the accelerator opening Acc is not less than the opening A1 but is less than another opening A3 and the torque demand Tr* is kept equal to 0, and a positive zone where the accelerator opening Acc is not less than the opening A3 and the torque demand Tr* takes positive values and linearly increases. The presence of the dead zone prevents the torque demand Tr* from frequently fluctuating between the positive values and the negative values. The dead zone is set to occupy a relatively wide area by taking into account the allowance to the driver's step-on of the accelerator pedal 83. The preset opening A2 is close to the opening A3 in the dead zone in the standard drive. The graph of the torque demand Tr* against the accelerator opening Acc in the constant speed drive will be discussed later.

When the computed accelerator opening Acc is less than the preset opening A2, the computed accelerator opening Acc is corrected according to Equation (2) given below (step S150). Equation (2) proportionally converts the accelerator opening Acc between the value '0' and the preset opening A2 into the accelerator opening Acc between the value '0' and the opening A1. The corrected accelerator opening Acc is thus less than the opening A1.

$$Acc \leftarrow Acc \cdot A1/A2 \quad (2)$$

The torque demand Tr* corresponding to the corrected accelerator opening Acc is derived from the graph of the torque demand Tr* against the accelerator opening Acc in the standard drive shown in FIG. 3. The corrected accelerator opening Acc is less than the opening A1, so that the torque demand Tr* is derived from the negative zone. The relation between the corrected accelerator opening Acc and the torque demand Tr* is obtainable from the relation between the accelerator opening Acc prior to correction and the torque demand Tr*. Namely the relation between the corrected accelerator opening Acc and the torque demand Tr* is expressible as the graph of the torque demand Tr* against the accelerator opening Acc in the constant speed drive shown in FIG. 3. The preset opening A2 is not identical with the opening A3. Such a difference gives a dead zone in the constant speed drive to prevent the torque demand Tr* from frequently fluctuating between the positive values and the negative values. As clearly understood from the comparison between the graph in the standard drive and the graph in the constant speed drive, correction of the accelerator opening Acc in the constant speed drive raises the linearity of the graph of the required torque Tr* against the accelerator opening Acc. The fractions of the negative zone (less than the opening A1) and the dead zone (between the openings A1 and A3) in the standard drive are changed to have the higher ratio of the negative zone (less than the preset opening A2) in the constant speed drive. This control leads to the higher linearity of the graph in the constant speed drive than that in the standard drive.

Figure 4:
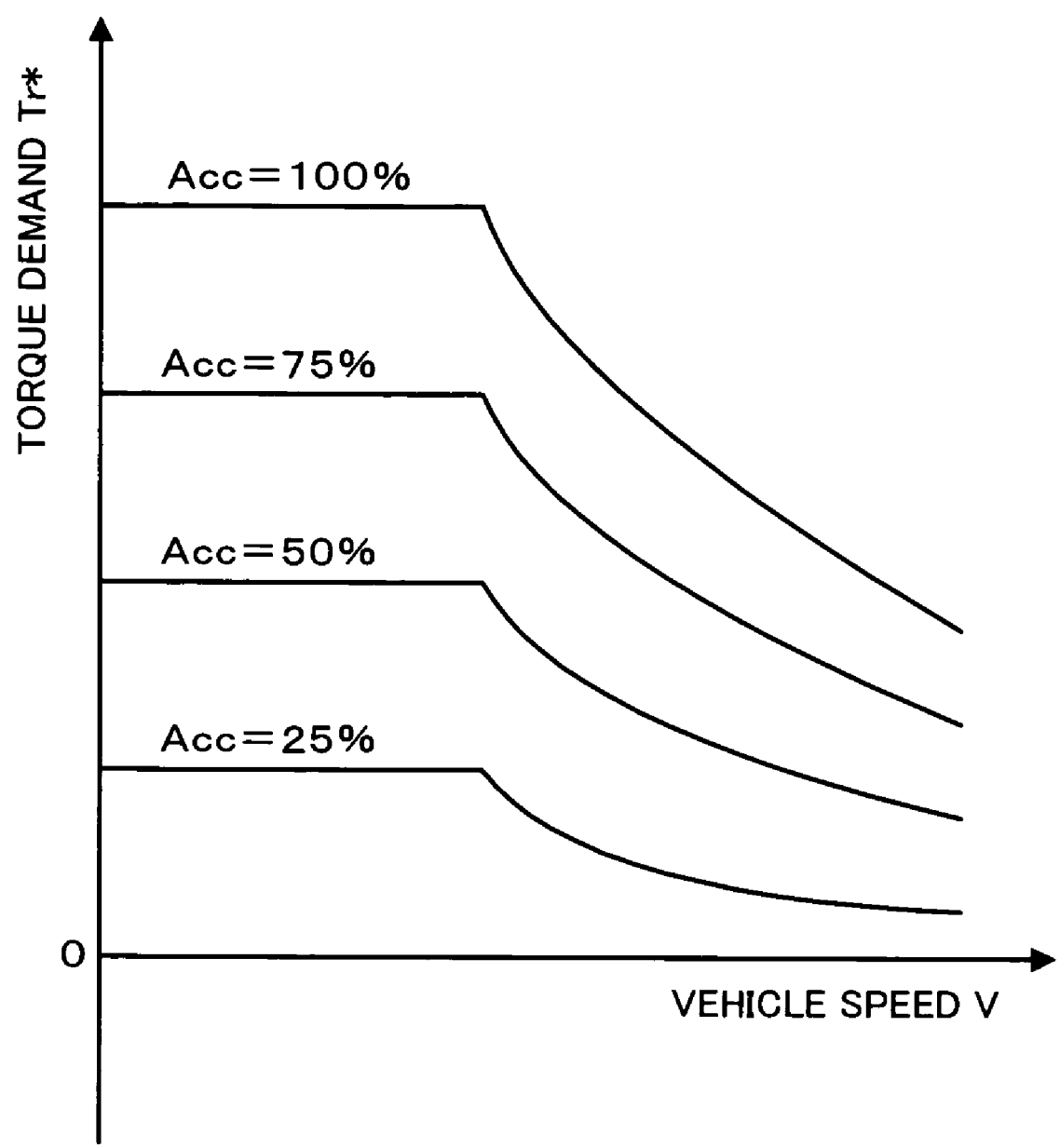
FIG. 4 shows an example of the torque demand setting map.

After the accelerator opening Acc is corrected, when the computed accelerator opening Acc is not less than the preset opening A2 at step S140, when it is determined at step S110 that the auto cruise mode is inactive, or when it is determined at step S120 that the driver is stepping on the accelerator pedal 83 in the auto cruise mode, the CPU 72 sets a torque demand Tr* and a power demand Pe* to be output from the engine 22, based on the corrected accelerator opening Acc, the setting of the accelerator opening Acc, or the accelerator opening Acc from the accelerator pedal position sensor 84 and the current vehicle speed V (step S160). The procedure of the embodiment specifies in advance variations in torque demand Tr* against the accelerator opening Acc and the vehicle speed V and stores the specified variations as a torque demand setting map in the ROM 74. The procedure reads and sets the torque demand Tr* corresponding to the given accelerator opening Acc and the given vehicle speed V from the stored torque demand setting map. FIG. 4 shows an example of the torque demand setting map. The power demand Pe* is calculated as the sum of the product of the setting of the torque demand Tr* and a revolution speed Nr of the ring gear shaft 32a, a charge-discharge demand Pb* of the battery 50, and a potential loss. The revolution speed Nr of the ring gear shaft 32a may be obtained by multiplying the vehicle speed V by a conversion coefficient k or by dividing the revolution speed Nm2 of the motor MG2 by a gear ratio Gr of the reduction gear 35. The charge-discharge demand Pb* is set according to the state of charge (SOC) of the battery 50 and the accelerator opening Acc.

Figure 5:
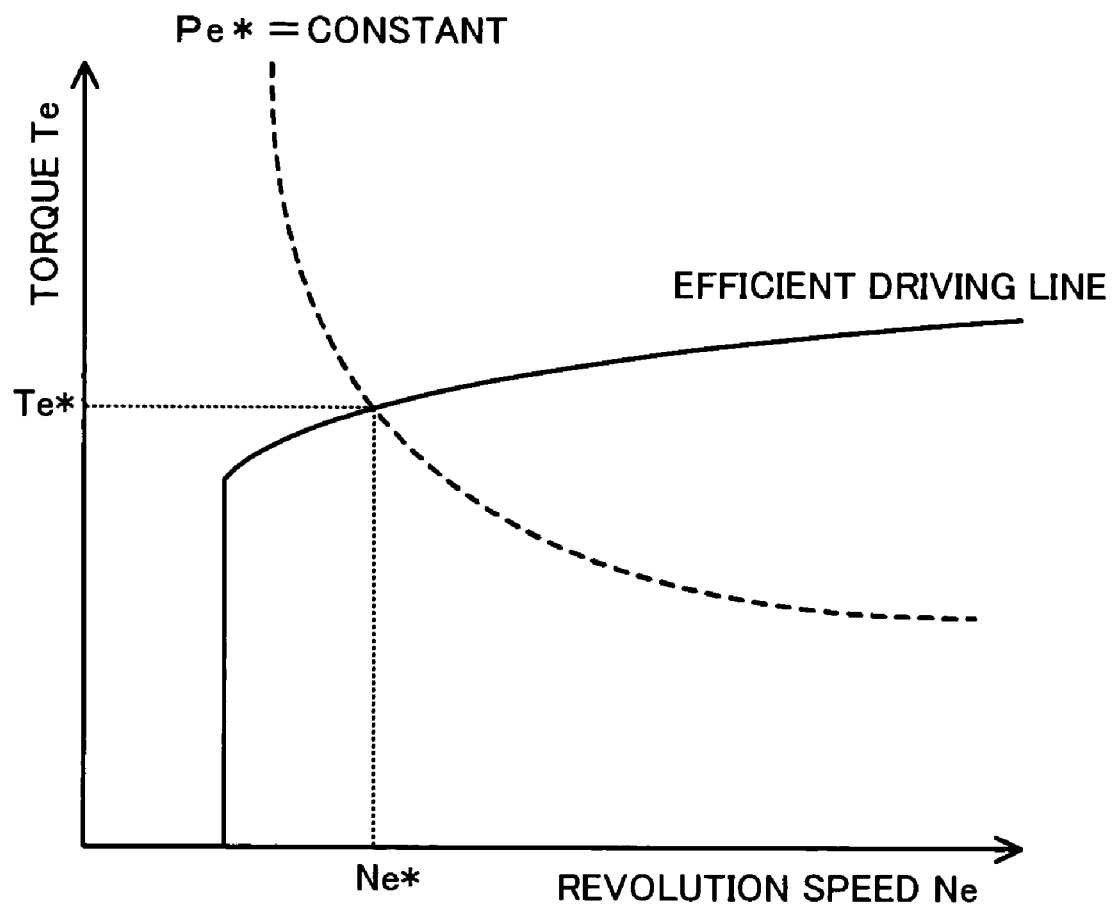
FIG. 5 shows an example of the efficient driving line of an engine 22 and the process of setting a target revolution speed Ne* and a target torque Te*.

After setting the torque demand Tr* and the power demand Pe*, a target revolution speed Ne* and a target torque Te* of the engine 22 are set according to the setting of the power demand Pe* (step S170). When the torque demand Tr* is set to the power demand Pe*, the target revolution speed Ne* and the target torque Te* are set according to an efficient drive line for efficiently driving the engine 22 and the setting of the power demand Pe*. An example of the efficient driving line of the engine 22 and the process of setting the target revolution speed Ne* and the target torque Te* are shown in FIG. 5. As illustrated, the target revolution speed Ne* and the target torque Te* are obtained as an intersection of the efficient driving line and a curve of constant power demand Pe* (=Ne*×Te*).

Figure 6:
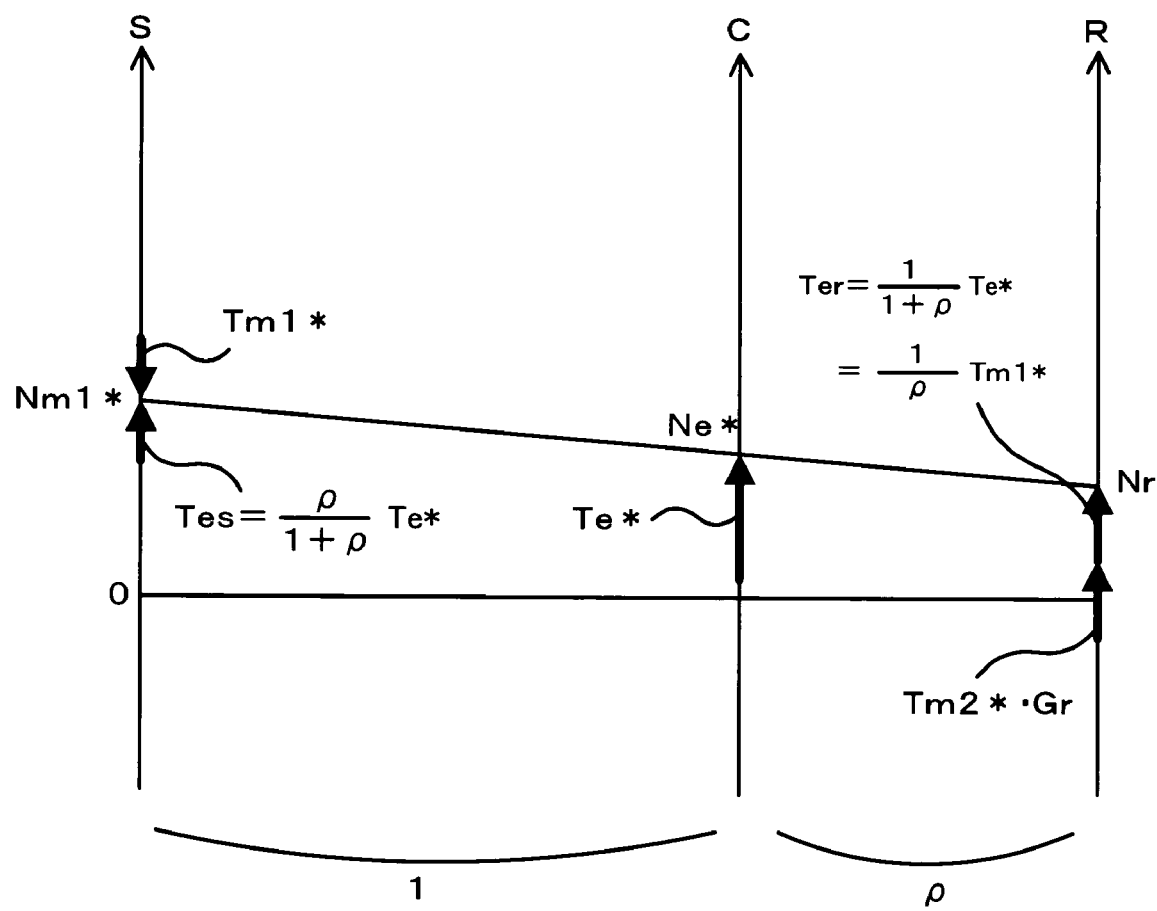
FIG. 6 is an alignment chart showing a dynamic relation between revolution speed and torque with respect to rotational elements in a power distribution integration mechanism 30.

The CPU 72 calculates a target revolution speed Nm1* of the motor MG1 from the setting of the target revolution speed Ne*, the revolution speed Nr (=Nm2/Gr) of the ring gear shaft 32a, and a gear ratio ρ of the power distribution integration mechanism 30 according to Equation (3) given below, while calculating a torque command Tm1* of the motor MG1 from the calculated target revolution speed Nm1* and the current revolution speed Nm1 according to Equation (4) given below (step S180). Equation (3) shows a dynamic relation of the rotational elements in the power distribution integration mechanism 30. FIG. 6 is an alignment chart showing a dynamic relation between the revolution speed and the torque with respect to the rotational elements in the power distribution integration mechanism 30. An axis S shows the revolution speed of the sun gear 31 that is equal to the revolution speed Nm1 of the motor MG1. An axis C shows the revolution speed of the carrier 34 that is equal to the revolution speed Ne of the engine 22. An axis R shows the revolution speed Nr of the ring gear 32 that is obtained by multiplying the revolution speed Nm2 of the motor MG2 by the gear ratio Gr of the reduction gear 35. Equation (3) is easily derived from this alignment chart. Two thick arrows on the axis R respectively represent a torque acting on the ring gear shaft 32a as a torque Te* output from the engine 22 is transmitted via the power distribution integration mechanism 30 while the engine 22 is steadily driven at a specific drive point defined by the target torque Te* and the target revolution speed Ne*, and a torque acting on the ring gear shaft 32a as a torque Tm2* output from the motor MG2 is transmitted via the reduction gear 35. Equation (4) shows a relation in feedback control to rotate the motor MG1 at the target revolution speed Nm1*. In Equation (4), 'k1' in the second term on the right side represents a gain of a proportional term and 'k2' in the third term on the right side represents a gain of an integral term.

$$Nm1^* = Ne^* \cdot (1+\rho)/\rho - Nm2/(Gr \cdot \rho) \tag{3}$$

$$Tm1^* = \text{Previous } Tm1^* + k1(Nm1^* - Nm1) + k2\int (Nm1^* - Nm1)dt \tag{4}$$

After calculation of the target revolution speed Nm1* and the torque command Tm1* of the motor MG1, the CPU 72 divides a difference between an output limit Wout of the battery 50 and a power consumption (generated power) of the motor MG1, which is the product of the calculated torque command Tm1* of the motor MG1 and the current revolution speed Nm1 of the motor MG1, by the current revolution speed Nm2 of the motor MG2 according to Equation (5) given below to calculate a torque limit Tmax as an upper limit torque output from the motor MG2 (step S190). The CPU 72 also calculates a tentative motor torque Tm2tmp as a torque to be output from the motor MG2 from the torque demand Tr*, the torque command Tm1*, and the gear ratio ρ of the power distribution integration mechanism 30 according to Equation (6) given below (step S200), and sets the smaller between the calculated torque limit Tmax and the calculated tentative motor torque Tm2tmp to a torque command Tm2* of the motor MG2 (step S210). Setting the torque command Tm2* of the motor MG2 in this manner enables the torque demand Tr* output to the ring gear shaft 32a as the drive shaft to be set as a restricted torque in the range of the output limit of the battery 50. Equation (5) is easily derived from the alignment chart of FIG. 6 discussed above.

$$Tmax = (Wout - Tm1^* \cdot Nm1)/Nm2 \tag{5}$$

$$Tm2tmp = (Tr^* - Tm1^*/\rho)/Gr \tag{6}$$

After setting the target revolution speed Ne* and the target torque Te* of the engine 22, the target revolution speed Nm1* and the torque command Tm1* of the motor MG1, and the torque command Tm2* of the motor MG2, the CPU 72 sends the target revolution speed Ne* and the target torque Te* of the engine 22 to the engine ECU 24 and the target revolution speed Nm1* and the torque command Tm1* of the motor MG1 and the torque command Tm2* of the motor MG2 to the motor ECU 40 (step S220) and exits from this drive control routine. The engine ECU 24 receives the target revolution speed Ne* and the target torque Te* and carries out fuel injection control and ignition control of the engine 22 to drive the engine 22 at a driving point defined by the target revolution speed Ne* and the target torque Te*. The motor ECU 40 receives the target revolution speed Nm1* and the torque commands Tm1* and Tm2* and carries out switching control of switching elements in the inverters 41 and 42 to drive the motor MG1 with the torque command Tm1* and to drive the motor MG2 with the torque command Tm2*.

As described above, the hybrid vehicle 20 of the embodiment computes the accelerator opening Acc from the previous accelerator opening Acc, the target vehicle speed V*, and the current vehicle speed V in the constant speed drive. When the computed accelerator opening Acc is less than the preset opening A2, the computed accelerator opening Acc is corrected to be in the range of less than the opening A1. The relation between the accelerator opening Acc and the torque demand Tr* in the standard drive is thus applicable to the control in the constant speed drive. The graph of the torque demand Tr* against the accelerator opening Acc prior to correction in the constant speed drive has the smaller fraction of the dead zone and the larger fraction of the negative zone to heighten the linearity, compared with the graph in the standard drive. This desirably stabilizes the vehicle speed V to the target vehicle speed V*. When the hybrid vehicle 20 runs on a downslope in the auto cruise mode, the arrangement ensures a smooth variation in torque demand Tr* and thus stabilizes the vehicle speed V to the target vehicle speed V*. In the constant speed drive, the graph of the torque demand Tr* against the accelerator opening Acc prior to correction has the dead zone. This effectively prevents the torque demand Tr* from frequently fluctuating between the positive values and the negative values.

The hybrid vehicle 20 of the embodiment executes proportional control with an estimated vehicle speed after a preset time period to set the accelerator opening Acc in the constant speed drive. The accelerator opening Acc in the constant speed drive may be set by general proportional control based on the difference between the target vehicle speed V* and the current vehicle speed V or by taking into account an integral term in addition to the proportional term.

The hybrid vehicle 20 of the embodiment utilizes the graph of the torque demand Tr* against the accelerator opening Acc in the standard drive, which has the linearly increasing negative zone and positive zone. The torque demand Tr* may increase along a curve or stepwise.

When the accelerator opening Acc set in the constant speed drive is less than the preset opening A2, the hybrid vehicle 20 of the embodiment corrects the accelerator opening Acc to be in the range of less than the opening A1 by proportional allotment. The proportional allotment is not restrictive at all, and any other suitable technique may be adopted to correct the accelerator opening Acc to be in the range of less than the opening A1.

When the accelerator opening Acc set in the constant speed drive is less than the preset opening A2, the hybrid vehicle 20 of the embodiment corrects the accelerator opening Acc to be in the range of less than the opening A1 by proportional allotment. The torque demand Tr* corresponding to the corrected accelerator opening Acc and the vehicle speed V is derived from the map of FIG. 4. Another available procedure modifies the map of the torque demand Tr* relative to the accelerator opening Acc and the vehicle speed V shown in FIG. 4 with the relation between the accelerator opening Acc and the torque demand Tr* in the constant speed drive shown in the lower graph of FIG. 3 and stores the modified map as a constant speed drive map into the ROM 74. The procedure reads the torque demand Tr* corresponding to the setting of the accelerator opening Acc (the accelerator opening Acc prior to correction) and the vehicle speed V from the constant speed drive map.

The hybrid vehicle 20 of the embodiment sets the torque demand Tr* and the power demand Pe* based on the accelerator opening Acc and the vehicle speed V, and sets the target revolution speed Ne* and the target torque Te* of the engine 22 based on the power demand Pe*. The target revolution speed Ne* and the target torque Te* of the engine 22 may otherwise be set, based on the accelerator opening Acc, the vehicle speed V, and the demand from the battery 50.

Figure 7:
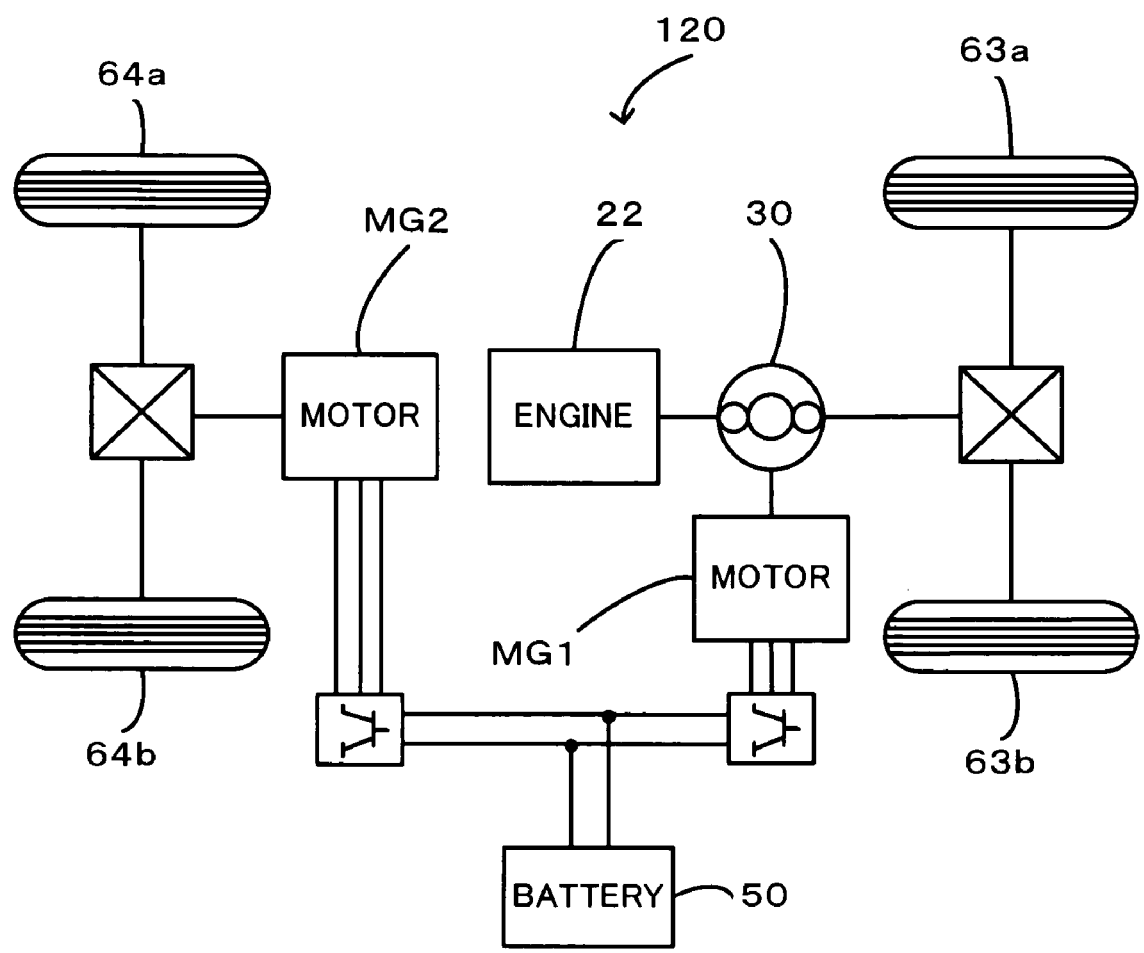
FIG. 7 schematically illustrates the construction of a hybrid vehicle 120 in one modified embodiment.

In the hybrid vehicle 20 of the embodiment, the power of the motor MG2 is subjected to gear change by the reduction gear 35 and is output to the ring gear shaft 32a. In one possible modification shown as a hybrid vehicle 120 of FIG. 7, the power of the motor MG2 may be output to another axle (that is, an axle linked with wheels 64a and 64b), which is different from an axle connected with the ring gear shaft 32a (that is, an axle linked with the drive wheels 63a and 63b).

Figure 8:
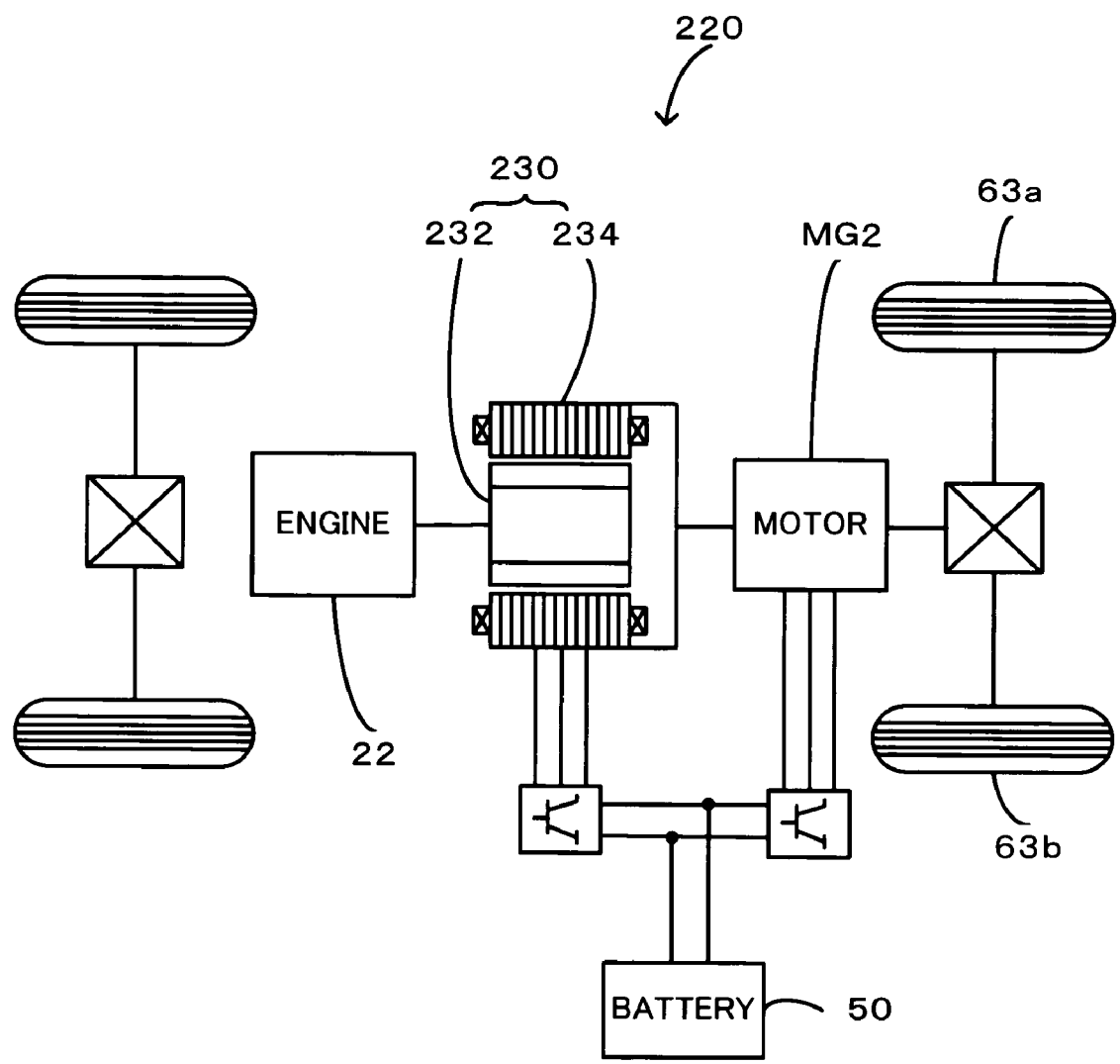
FIG. 8 schematically illustrates the configuration of a hybrid vehicle 220 in another modified embodiment.

In the hybrid vehicle 20 of the embodiment, the power of the engine 22 is output via the power distribution integration mechanism 30 to the ring gear shaft 32a functioning as the drive shaft linked with the drive wheels 63a and 63b. In another possible modification of FIG. 8, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

In the hybrid vehicle 20 of the embodiment and the hybrid vehicles 120 and 220 of the modified examples, the power from the engine 22 is output to the ring gear shaft 32a functioning as the drive shaft linked with the axle through inputs and outputs of electric powers and mechanical powers. Alternatively the power from the engine 22 may not be output to the drive shaft linked with the axle.

The above embodiment is to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

INDUSTRIAL APPLICABILITY

The technique of the invention is applicable to automobile manufacture.

The invention claimed is:

1. A hybrid vehicle driven with power from a motor and an internal combustion engine, where the motor is capable of outputting power to a drive shaft linked with an axle, said hybrid vehicle comprising:
 a vehicle speed sensor that measures a vehicle speed;
 a target vehicle speed setting module that sets a target vehicle speed for a constant speed drive, in response to a driver's setting action; and a drive control module that, in the case of no setting the target vehicle speed by said target vehicle speed setting module, sets a vehicle drive command value in response to the driver's accelerator step-on action, refers to a non-linear setting map to set a vehicle driving force corresponding to the vehicle drive command value, and drives and controls the motor and the internal combustion engine to drive said hybrid vehicle with the setting of the vehicle driving force,
 while in the case of setting the target vehicle speed by said target vehicle speed setting module, said drive control module setting the vehicle drive command value, based on the vehicle speed measured by said vehicle speed sensor and the target vehicle speed, so as to drive said hybrid vehicle at the target vehicle speed, setting the vehicle driving force corresponding to the vehicle drive command value, in order to have a higher linearity than that of the vehicle driving force set by a non-linear portion of the non-linear setting map with respect to at least part of the vehicle drive command value equivalent to the non-linear portion, and driving and controlling the motor and the internal combustion engine to drive said hybrid vehicle with the setting of the vehicle driving force.

2. A hybrid vehicle in accordance with claim 1, wherein the non-linear setting map has a negative zone, a dead zone kept substantially equal to 0, and a positive zone against the vehicle drive command value, and said drive control module sets the vehicle driving force according to the non-linear setting map and the vehicle drive command value, which is not less than a preset opening included in the dead zone of the non-linear setting map, in response to setting of the target vehicle speed, while correcting the vehicle drive command value, which is less than the preset opening, to make an area to the preset opening equivalent to the negative zone and setting the vehicle driving force according to the non-linear setting map and the corrected vehicle drive command value.

3. A hybrid vehicle in accordance with claim 2, wherein the non-linear setting map linearly increases the vehicle driving force with an increase in vehicle drive command value in the negative zone and in the positive zone.

4. A hybrid vehicle in accordance with claim 1, wherein said drive control module uses a linear setting map, which has a higher linearity than the non-linear setting map, to set the vehicle driving force corresponding to the vehicle drive command value, in response to setting of the target vehicle speed.

5. A hybrid vehicle in accordance with claim 4, wherein the non-linear setting map has a negative zone, a dead zone kept substantially equal to 0, and a positive zone against the vehicle drive command value, and the linear setting map has a negative zone which has a higher fraction, a dead zone which is kept substantially equal to 0 and has a lower fraction, compared with the fractions of the negative zone and the dead zone in the non-linear setting map, and a positive zone.

6. A hybrid vehicle in accordance with claim 5, wherein the non-linear setting map and the linear setting map linearly increase the vehicle driving force with an increase in vehicle drive command value in the negative zone and in the positive zone.

7. A hybrid vehicle in accordance with claim 1, said hybrid vehicle further comprising:

an electric power-mechanical power input-output module that is linked with an output shaft of the internal combustion engine and the drive shaft and outputs at least part of the power from the internal combustion engine to the drive shaft through inputs and outputs of electric power and mechanical power.

8. A hybrid vehicle in accordance with claim 7, wherein said electric power-mechanical power input-output module comprises:

a three shaft-type power input-output assembly that is linked with three shafts, that is, the output shaft of the internal combustion engine, the drive shaft, and a third shaft and inputs and outputs power to a residual shaft, based on powers input from and output to two shafts among the three shafts; and a generator that inputs and outputs power from and to the third shaft.

9. A hybrid vehicle in accordance with claim 7, wherein said electric power-mechanical power input-output module comprises a pair-rotor motor that has a first rotor linked with the output shaft of the internal combustion engine and a second rotor linked with the drive shaft and outputs at least part of the power from the internal combustion engine to the drive shaft through input and output of electric power by electromagnetic interaction between the first rotor and the second rotor.

* * * * *

UNITED STATES PATENT AND TRADEMARK OFFICE
CERTIFICATE OF CORRECTION

PATENT NO. : 7,367,414 B2
APPLICATION NO. : 10/559828
DATED : May 6, 2008
INVENTOR(S) : Hiroaki Iida et al.

It is certified that error appears in the above-identified patent and that said Letters Patent is hereby corrected as shown below:

| Column | Line | |
|---|---|---|
| 7 | 61-63 | Change Equation (1) to read as follows: |

--Acc←Previous Acc before tp+k{V*-V+t (V-Previous V before tp)} (1)--.

| | | |
|---|---|---|
| 10 | 7-10 | Change Equation (3) to read as follows: |

--$Nm1^* = Ne^* \cdot (1+\rho)/\rho - Nm2/(Gr \cdot \rho)$     (3)--.

Change Equation (4) to read as follows:

--$Tm1^* = $ Previous $Tm1^* + k1(Nm1^* - Nm1) + k2\int (Nm1^* - Nm1)dt\}$     (4)--.

| | | |
|---|---|---|
| 10 | 36-38 | Change Equation (5) to read as follows: |

--$Tmax = (Wout - Tm1^* \cdot NM1)/Nm2$     (5)--.

Change Equation (6) to read as follows:

--$Tm2tmp = (Tr^* + Tm1^*/\rho)/Gr$     (6)--.

UNITED STATES PATENT AND TRADEMARK OFFICE
CERTIFICATE OF CORRECTION

PATENT NO. : 7,367,414 B2
APPLICATION NO. : 10/559828
DATED : May 6, 2008
INVENTOR(S) : Hiroaki Iida et al.

It is certified that error appears in the above-identified patent and that said Letters Patent is hereby corrected as shown below:

| Column | Line | |
|---|---|---|
| 13 | 4 | Change "A hybrid" to --The hybrid--. |
| | 19 | Change "A hybrid" to --The hybrid--. |
| | 23 | Change "A hybrid" to --The hybrid--. |
| | 29 | Change "A hybrid" to --The hybrid--. |
| 14 | 1 | Change "A hybrid" to --The hybrid--. |
| | 6 | Change "A hybrid" to --The hybrid--. |
| | 15 | Change "A hybrid" to --The hybrid--. |
| | 27 | Change "A hybrid" to --The hybrid--. |

Signed and Sealed this

Fifteenth Day of December, 2009

David J. Kappos
*Director of the United States Patent and Trademark Office*